United States Patent
Matsuura

[11] Patent Number: 5,182,714
[45] Date of Patent: Jan. 26, 1993

[54] DIGITIZING CONTROL APPARATUS

[75] Inventor: Hitoshi Matsuura, Hachioji, Japan

[73] Assignee: Fanuc Ltd., Japan

[21] Appl. No.: 623,664

[22] PCT Filed: May 15, 1990

[86] PCT No.: PCT/JP90/00615
§ 371 Date: Jan. 8, 1991
§ 102(e) Date: Jan. 8, 1991

[87] PCT Pub. No.: WO90/14924
PCT Pub. Date: Dec. 13, 1990

[30] Foreign Application Priority Data

May 30, 1989 [JP] Japan .................................. 1-136746

[51] Int. Cl.$^5$ .................. G05B 19/405; B23Q 35/127
[52] U.S. Cl. .............................. 364/474.03; 364/191
[58] Field of Search ...................... 364/474.01, 474.03, 364/474.05, 474.29, 191, 474.37; 318/569, 570, 577

[56] References Cited
U.S. PATENT DOCUMENTS 4,396,832  8/1983  Henderson ...................... 364/474.03
4,590,580  5/1986  Takezawa et al. ................... 364/571
4,679,159  7/1987  Yamazaki et al. .............. 364/474.03

Primary Examiner—Jerry Smith
Assistant Examiner—Paul Gordon
Attorney, Agent, or Firm—Staas & Halsey

[57] ABSTRACT

A digitizing control apparatus successively receives positional data and produces NC data while tracing the shape of a model. The digitizing control apparatus has a tracer head (3) having first and second non-contact-type distance detectors (30a, 30b) for independently measuring distances up to the surface of the model, the first and second non-contact-type distance detectors being positioned to travel parallel to a feed direction. A sampling circuit (16) samples measured values from the first and second distance detectors (30a, 30b) at predetermined times. A memory (13) stores a previously sampled measured value from the non-contact-type distance detector (30a) and a previously sampled measured value from the non-contact-type distance detector (30b). Data in a normal direction of the model surface (4) are determined based on at least three of the previously sampled measured values, a presently sampled measured value from the non-contact-type distance detector (30a), and a presently sampled measured value from the non-contact-type distance detector (30b). Therefore, the data in the normal direction can be obtained at high speed. The data in the normal direction thus determined are used in the determination of a tool offset, for example.

3 Claims, 3 Drawing Sheets

DIGITIZING CONTROL APPARATUS

BACKGROUND OF THE INVENTION

1. Field of the Invention

The present invention relates to a digitizing control apparatus for successively receiving positional data and producing NC data while tracing the shape of a model, and more particularly to a digitizing control apparatus of simple arrangement which can obtain highly accurate data in a direction normal to the surface of a model.

2. Background of the Related Art

Heretofore, there has been employed a contact-type probe as a tracer head in a digitizing control apparatus. While the contact-type probe is being held in contact with a model surface, displacement information is obtained from the model surface by the probe, and feed control data or NC data are calculated from the obtained displacement information. However, the surface of a model which is of a soft material tends to be damaged by the pressure with which the probe is held against the model.

To overcome the above drawback, there has been developed a digitizing control apparatus which has a tracer head comprising a non-contact-type detector for detecting the distance up to the surface of a model in a non-contact manner.

Unlike the contact-type probe, however, the non-contact-type detector can detect only one-dimensional displacement information at one time. In order to obtain data in a direction normal to the surface of a model, which data are required to calculate a tool offset, for example, three non-contact-type detectors are employed to determine the coordinates of three points on the model surface, and a vector in the normal direction are calculated from the coordinates of the three points. According to another attempt, a zigzag tracing path is generated, and a vector in the normal direction is calculated from the coordinates of three points that are successively measured on the tracing path.

Use of the three non-contact-type detectors is not preferred because of the required high cost. Generation of the zigzag tracing path imposes mechanical limitations such as on a feed speed, etc., results in a reduced degree of accuracy, and takes an increased period of time for digitizing.

SUMMARY OF THE INVENTION

The present invention has been made in view of the aforesaid drawbacks. It is an object of the present invention to provide a digitizing control apparatus of simple arrangement which can obtain highly accurate data in a direction normal to the surface of a model.

To solve the above problems, there is provided in accordance with the present invention a digitizing control apparatus for successively receiving positional data and producing NC data while tracing the shape of a model, comprising a tracer head having first and second non-contact-type distance detectors for independently measuring distances up to the surface of the model, the first and second non-contact-type distance detectors being positioned to travel parallel to a feed direction, sampling means for sampling measured values from the first and second distance detectors at predetermined times, memory means for storing a previously sampled first measured value from the first non-contact-type distance detector and a previously sampled second measured value from the second non-contact-type distance detector, and calculating means for determining data in a normal direction of the surface of the model based on at least three of the first and second measured values, a presently sampled third measured value from the first non-contact-type distance detector, and a presently sampled fourth measured value from the second non-contact-type distance detector.

The coordinates of respective vertexes of a small rectangular shape on the surface of the model are determined on the basis of the previously and presently sampled measured values from the two distance detectors, and the vector in the normal direction is determined on the basis of the coordinates of three of the vertexes, so that the data in the normal direction are obtained.

DESCRIPTION OF THE PREFERRED EMBODIMENT

An embodiment of the present invention will hereinafter be described with reference to the drawings.

Figure 1:
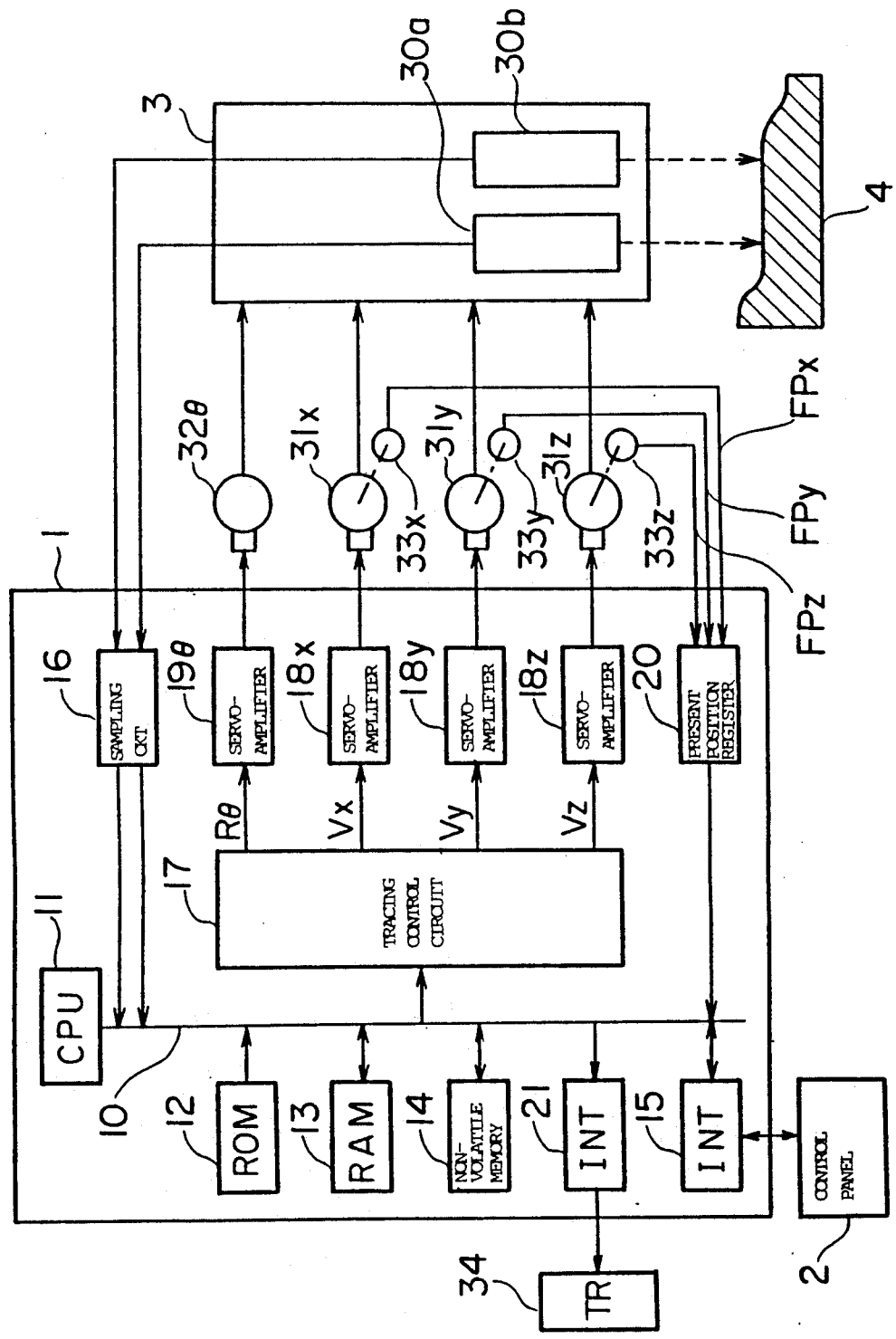
FIG. 1 is a block diagram showing the hardware arrangement of a digitizing control apparatus according to an embodiment of the present invention.

FIG. 1 is a block diagram showing the hardware arrangement of a digitizing control apparatus according to an embodiment of the present invention. In FIG. 1, a processor 11 reads a system program stored in a ROM 12 through a bus 10, and controls the overall operation of a digitizing control apparatus 1 according to the system program. A RAM 13 comprises a DRAM for storing sampled measured values and other temporary data. A non-volatile memory 14 is backed up by a battery (not shown), and stores various parameters required by digitizing. These parameters are entered from a control panel 2 through an interface 15.

A tracer head 3 comprises distance detectors 30a, 30b each of the type for measuring the intensity of reflected light. Each of the distance detectors 30a, 30b includes a light source such as a semiconductor laser or a light-emitting diode, and measures the distance between each of the distance detectors 30a, 30b and model 4 in a non-contact fashion. The tracer head 3 may instead comprise optical triangular-surveying-type distance detectors, eddy-current-type distance detectors employing high-frequency oscillation, ultrasonic distance detectors, or the like.

The digitizing control apparatus also has a sampling circuit 16 for sampling the measured values from the distance detectors 30a, 30b at predetermined sampling times, and storing the sampled data in the RAM 13. The stored data are successively read by a processor 11, which calculates an axial displacement of the tracer head 3 and data in a normal direction based on the read data.

A tracing control circuit 17 is supplied with commands with respect to a feeding direction, a tracing speed, etc., of the tracer head 3 from the processor 11, and also with the axial displacement of the tracer head 3, for generating speed signals Vx, Vy, Vz for respective axes according to the known process. Servoamplifiers 18x, 18y, 18z amplify the speed signals Vx, Vy, Vz, respectively, and energize X-, Y-, and Z-axis servomotors 31x, 31y, 31z mounted on a tracing machine with the amplified speed signals, thereby moving the tracer head 3 in the commanded feed direction at the commanded feed speed while being spaced a constant distance up to the surface of the model 4 from either one of the distance detectors 30a, 30b or a point intermediate between the distance detectors 30a, 30b.

Simultaneously with the above control process, the tracing control circuit 17 also generates a rotation control signal $R\theta$ based on the commanded feed direction. A servoamplifier $19\theta$ amplifies the rotation control command $R\theta$ to energize a $\theta$-axis servomotor $32\theta$ attached to the tracer head 3, for controlling the distance detectors 30a, 30b of the tracer head 3 to run accurately parallel to the feed direction at all times.

Pulse coders 33x, 33y, 33z generate pulse signals FPx, FPy, FPz each time the servomotors 31x, 31y, 31z rotate through a predetermined angle. A present position register 20 in the digitizing control apparatus 1 reversibly counts the pulse signals from the pulse coders 33x, 33y, 33z, thereby to store the present positions of the respective axes, and supplies the stored present positions as positional data to the processor 11.

The processor 11 reads the positional data at predetermined time intervals or when a variation in the positional data exceeds a predetermined tolerable value, and determines an offset according to the shape of a tool from the data in the normal direction, thereby generating NC data.

The NC data are supplied through an interface 21 to a tape reader/puncher 34, which then produces an NC tape. If a numerically controlled machine tool (not shown) is connected directly to the interface 21, then a highly accurate tracing machining process can be performed on an on-line basis.

Figure 2:
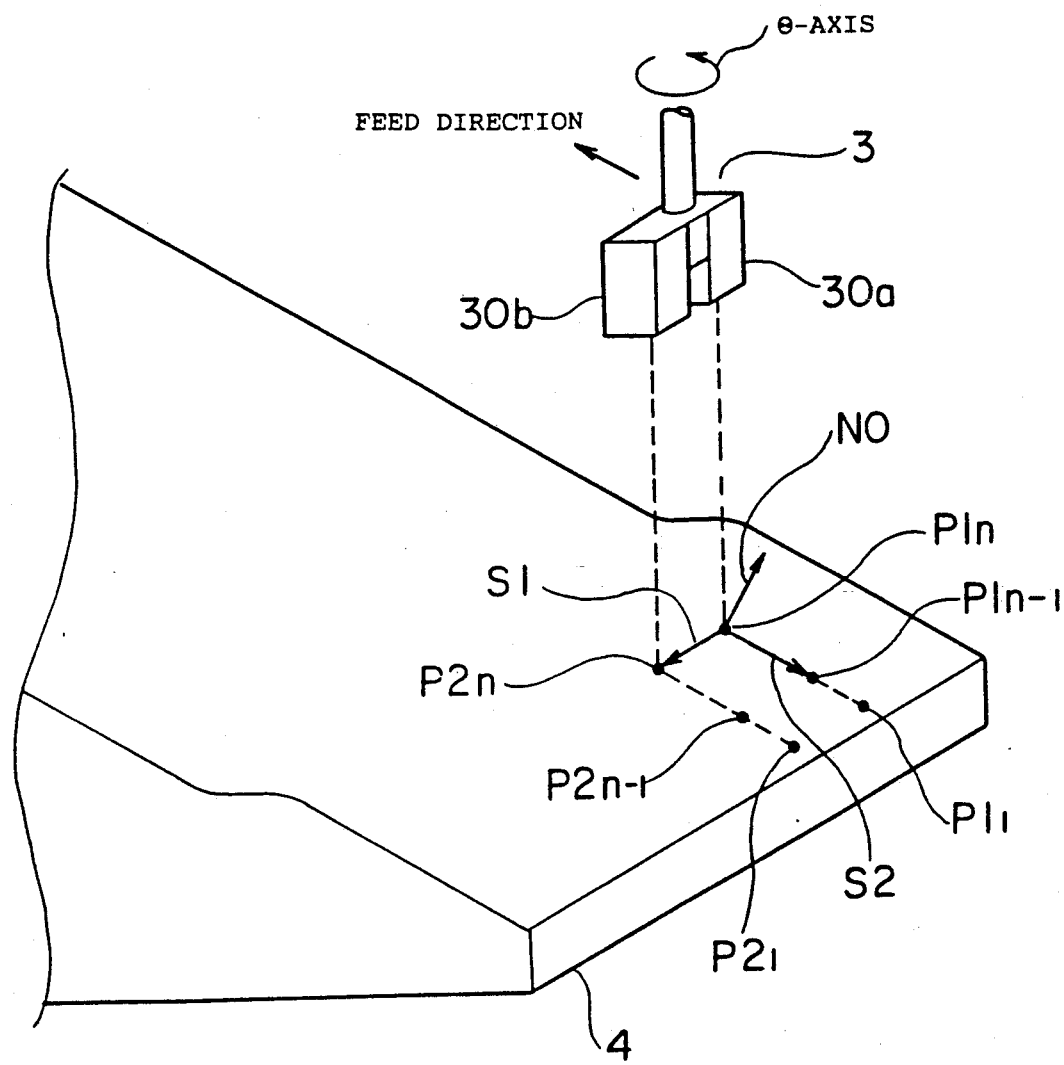
FIG. 2 is a fragmentary perspective view showing a process of calculating data in a normal direction, using the digitizing control apparatus according to the embodiment of the present invention.

FIG. 2 is illustrative of a process of calculating data in a normal direction, using the digitizing control apparatus described above. In FIG. 2, the tracer head 3 moves in a feed direction at a predetermined tracing speed, and the measured value from the distance detector 30a is sampled at predetermined times. The coordinates of points $P1_1, \ldots P1_{n-1}, P1_n$ on the surface of the model 4 are determined from the sampled measured values and the data is stored in the present position register 20 shown in FIG. 1. Likewise, the coordinates of points $P2_1, \ldots P2_{n-1}, P2_n$ are determined from the sampled measured values from the distance detector 30b and the data is stored in the present position register 20.

Then, a surface vector S1 $[X2_n - X1_n, Y2_n - Y1_n, Z2_n - Z1_n]$ is determined from the coordinates $(X1_n, Y1_n, Z1_1)$ of the point $P1_n$ and the coordinates $(X2_n, Y2_n, Z2_n)$ of the point $P2_n$. A surface vector S2 $[X1_{n-1} - X1_n, Y1_{n-1} - Y1_n, Z1_{n-1} - Z1_n]$ is determined from the coordinates $(X1_n, Y1_n, Z1_n)$ of the point $P1_n$ and the coordinates $(X1_{n-1}, Y1_{n-1}, Z1_{n-1})$ of the point $P1_{n-1}$.

The data in the normal direction are obtained when the exterior product of the surface vectors S1, S2 is calculated to determine a vector N0 in the normal direction according to the equation:

$$N0 = S1 \times S2.$$

Figure 3:
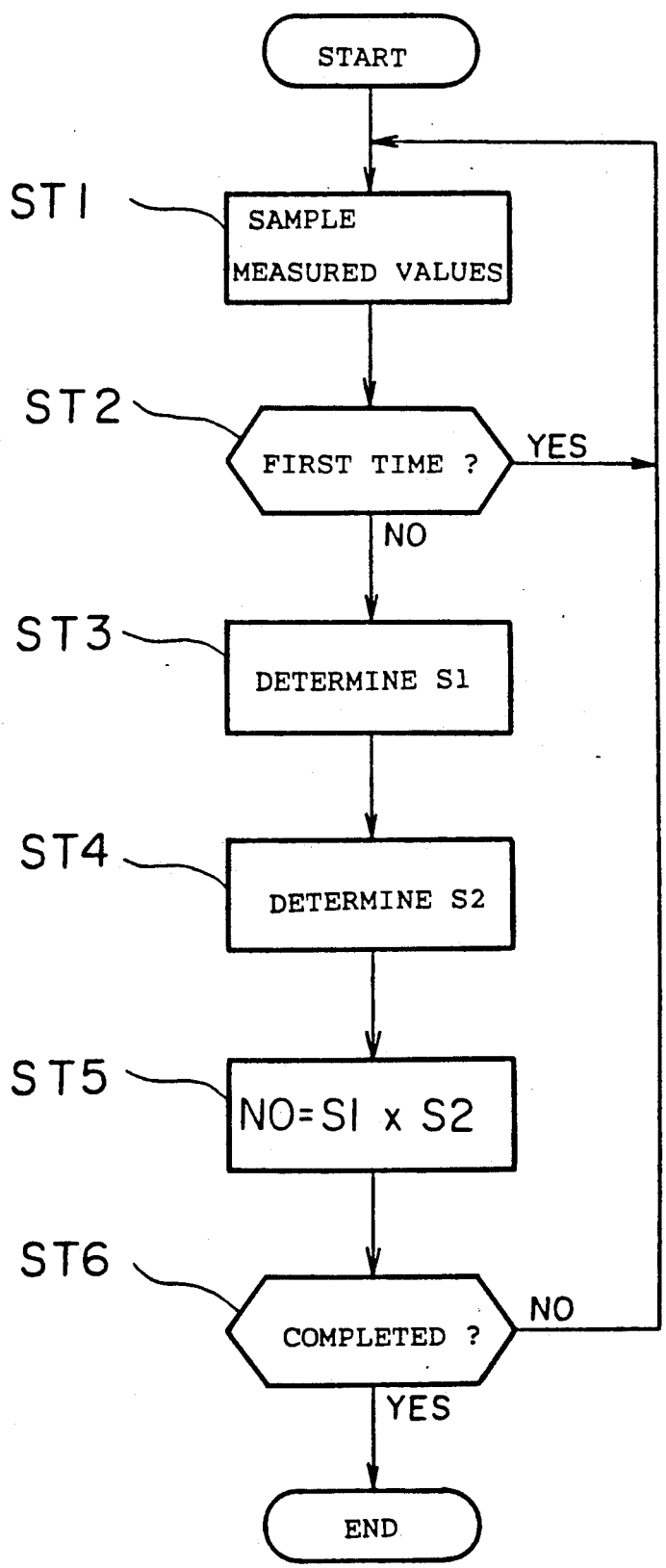
FIG. 3 is a flowchart of the process of calculating data in a normal direction, using the digitizing control apparatus according to the embodiment of the present invention.

FIG. 3 is a flowchart of a process for calculating the data in the normal direction, using the digitizing control apparatus according to the embodiment of the present invention. The numerals following "ST" in FIG. 3 represent step numbers.

[ST1] The measured values start being sampled.

[ST2] If the measured values are sampled for the first time, then control returns to the step ST1 to sample the measured values again.

[ST3] The surface vector S1 is determined on the basis of the presently sampled measured value from the distance detector 30a and the presently sampled measured value from the distance detector 30b.

[ST4] The surface vector S2 is determined on the basis of the presently sampled measured value from the distance detector 30a and the previously sampled measured value from the distance detector 30a.

[ST5] The exterior product of the surface vectors S1, S2 is calculated to determine the vector N0 in the normal direction, thereby obtaining the data in the normal direction of the surface.

[ST6] Whether the digitizing of data in a commanded range is completed or not is determined. If not, then control goes back to the step ST1, and the next sampling is carried out.

In the above embodiment, the vector in the normal direction is determined on the basis of the previously sampled measured value from one of the distance detectors and the presently sampled measured values from both distance detectors. However, the vector in the normal direction may also be determined from three points according to another combination among the four measured values which are sampled at least presently and previously.

With the present invention, as described above, the coordinates of respective vertexes of a small rectangular shape on the surface of the model are determined on the basis of the previously and presently sampled measured values from the two distance detectors, and the vector in the normal direction is determined on the basis of the coordinates of three of the vertexes, so that the data in the normal direction are obtained. Therefore, the digitizing control apparatus is less costly than the conventional apparatus which employs three distance detectors. Furthermore, it is not necessary to feed the tracer head along a zigzag path, so that the data can be digitized highly accurately without being limited by the feed speed.

I claim:

1. A digitizing control apparatus for successively receiving positional data and producing NC data while tracing a shape of a model having a surface, comprising:

a tracer head having first and second non-contact-type distance detectors for independently measuring distances between said first and second non-contact-type distance detectors and the surface of the model, the first and second non-contact-type distance detectors being positioned to travel parallel to a feed direction;

sampling means for sampling measured values from said first and second distance detectors at predetermined times;

memory means for storing a previously sampled first measured value from said first non-contact-type distance detector and a previously sampled second measured value from said second non-contact-type distance detector; and calculating means for determining data in a normal direction of said surface of the model based on at least three of said first measured value, said second measured value, a presently sampled third measured value from said first non-contact-type distance detector, and a presently sampled fourth measured value from said second non-contact-type distance detector, and for generating the NC data using the data.

2. A digitizing control apparatus according to claim 1, wherein said calculating means comprises means for determining coordinates of three points on said surface of the model based on said three measured values, generating first and second vectors from said coordinates of the three points, and calculating an exterior product of said first and second vectors, thereby determining said data in the normal direction.

3. A digitizing control apparatus according to claim 1, wherein said tracer head is rotated through an angle based on said feed direction.

* * * * *